United States Patent [19]
Yamada et al.

[11] Patent Number: 5,515,017
[45] Date of Patent: May 7, 1996

[54] SELECTABLE FREQUENCY DIELECTRIC FILTER HAVING A GANGED RELATION OUTPUT SWITCH

[75] Inventors: Yasuo Yamada; Tadahiro Yorita, both of Kyoto, Japan

[73] Assignee: Murata Manufacturing Co., Ltd., Japan

[21] Appl. No.: 342,605

[22] Filed: Nov. 21, 1994

[30]    Foreign Application Priority Data

Nov. 24, 1993   [JP]   Japan ................... 5-293496

[51] Int. Cl.⁶ ................................................ H01P 1/202
[52] U.S. Cl. .................................... 333/207; 333/134
[58] Field of Search ............................. 333/101, 103, 333/105, 106, 126, 129, 134, 174–176, 202–207

[56]            References Cited

U.S. PATENT DOCUMENTS

| | | | |
|---|---|---|---|
| 4,162,446 | 7/1979 | Cochran | 333/165 X |
| 4,186,360 | 1/1980 | Ohashi | 334/55 |
| 4,694,262 | 9/1987 | Inoue et al. | 331/96 |
| 4,980,660 | 12/1990 | Nakamura et al. | 333/207 X |
| 5,065,120 | 11/1991 | Munn | 333/202 X |
| 5,227,748 | 7/1993 | Sroka | 333/235 X |
| 5,241,693 | 8/1993 | Kim et al. | 333/206 X |
| 5,387,886 | 2/1995 | Takalo et al. | 333/134 X |

FOREIGN PATENT DOCUMENTS

| | | |
|---|---|---|
| 0570184 | 11/1993 | European Pat. Off. . |
| 6087505 | 5/1985 | Japan . |
| 4332210 | 11/1992 | Japan . |

OTHER PUBLICATIONS

European Search Report dated Mar. 9, 1995.

*Primary Examiner*—Benny T. Lee
*Assistant Examiner*—Justin P. Bettendorf
*Attorney, Agent, or Firm*—Ostrolenk, Faber, Gerb & Soffen

[57]            ABSTRACT

Coupling capacitors are connected between an input end and an output end, a resonator is connected between each of the coupling capacitor and the ground, and a capacitor and a switch are connected between one end of each resonator and the ground. When the capacitor is off, the frequency is set to the resonance frequency of the resonator, and when the switch is turned on, the capacitor is connected parallel to the resonator, so that the resonance frequency is shifted to a lower value, whereby a dielectric filter having multiple frequencies can be obtained.

15 Claims, 3 Drawing Sheets

SELECTABLE FREQUENCY DIELECTRIC FILTER HAVING A GANGED RELATION OUTPUT SWITCH

BACKGROUND OF THE INVENTION

1. Field of the Invention

The present invention relates to a dielectric filter. More specifically, the present invention relates to a dielectric filter in which a capacitor or an inductance is connected in parallel to a dielectric resonator by means of a switch, so as to provide multiple frequencies by the switching of the switch.

2. Description of the Background Art

FIG. 1 shows a conventional dielectric filter. Referring to FIG. 1, coupling capacitors C1, C2 and C3 are connected in series between input and output terminals, a resonator R1 is connected between a node between coupling capacitors C1 and C2 and ground, and a resonator R2 is connected between a node between coupling capacitors C2 and C3 and ground.

FIG. 2 shows the frequency-amplitude characteristic of the dielectric resonator shown in FIG. 1. The bandpass filter characteristic of the dielectric filter shown in FIG. 1 has one central frequency $f_0$, as shown in FIG. 2. Therefore, a different dielectric filter cannot freely select the central frequency.

FIG. 3 is a schematic diagram showing a conventional, duplex-type dielectric filter. The duplex-type dielectric filter shown in FIG. 3 includes a transmitting-side dielectric filter 11, a receiving-side dielectric filter 12, a matching circuit 13 connected between the transmitting-side filter 11 and an antenna terminal ANT, and a matching circuit 14 connected between the receiving-side dielectric filter 12 and antenna terminal ANT. Transmitting-side dielectric filter 11 is structured in a manner similar to that of the dielectric filter shown in FIG. 1. Receiving-side dielectric filter 12 is also structured in the same manner, and includes coupling capacitors C11, C12 and C13, as well as resonators R3 and R4.

In the duplex-type dielectric filter shown in FIG. 3, the characteristic of the transmitting-side dielectric filter 11 and the receiving-side dielectric filter 12 has one central frequency $f_0$ as shown in FIG. 2. It is necessary to provide two bandpass filter circuits, that is, transmitting-side and receiving-side dielectric filters 11 and 12, and also to provide matching circuits 13 and 14 for matching these with the impedance of the antenna. Therefore, the required number of parts is considerably large.

SUMMARY OF THE INVENTION

Therefore, an object of the present invention is to provide a dielectric filter which allows selection of multiple frequencies.

Briefly stated, the present invention provides a dielectric filter formed of at least one dielectric resonator, and includes a reactance element having one end connected to one end of the aforementioned at least one dielectric resonator, and a switch for connecting another end of the reactance element to another end of the aforementioned at least one dielectric resonator.

Therefore, according to the present invention, since the reactance element is connected parallel to the dielectric resonator by the switching of the switch, multiple frequencies, that is, the resonance frequency inherent to the dielectric resonator and the resonance frequency when the reactance element is connected in parallel, can be obtained.

More preferably, a distribution switch or an input switch may be switched in ganged relation with the aforementioned switch, so as to distribute output signals from the dielectric resonator, or to switch the input signal to the dielectric resonator. When one of the dielectric filters is used for transmission and another is used for reception, the dielectric resonator can be used as a duplexer, and matching circuits become unnecessary.

More preferably, a plurality of reactance elements may be connected to one end of the aforementioned at least one dielectric resonator and any of the reactance elements may be connected parallel to the dielectric resonator by means of a switch, whereby larger numbers of frequencies can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
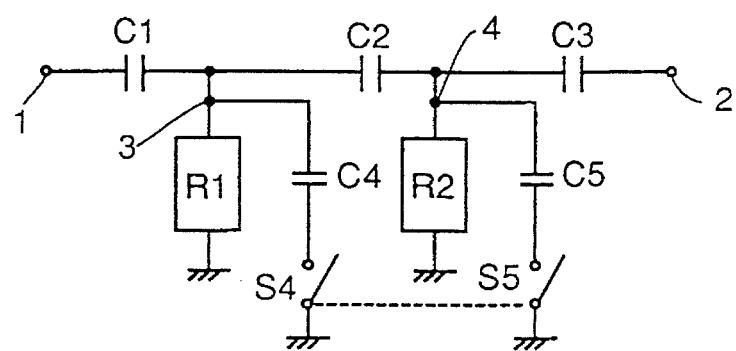
FIG. 4 is a schematic diagram of the dielectric filter in accordance with one embodiment of the present invention.

FIG. 4 is a schematic diagram of the dielectric filter in accordance with one embodiment of the present invention. Referring to FIG. 4, coupling capacitors C1, C2 and C3 are connected in series between an input terminal 1 and an output terminal 2. A dielectric resonator R1 is connected between a node of coupling capacitors C1 and C2 and ground, and a series circuit of a capacitor C4 and a switch S4 is connected between one end 3 of dielectric resonator R1 and ground. A dielectric resonator R2 is connected between a node of coupling capacitors C2 and C3 and ground, and a series circuit of a capacitor C5 and a switch S5 is connected between one end 4 of dielectric resonator R2 and ground. Switches S4 and S5 are switched in relation to each other. Dielectric resonators R1 and R2 are dielectric resonators having the wavelength of λ/4, which are coupled by coupling capacitors C1, C2 and C3 and provide two stages of bandpass filters.

Figure 5:
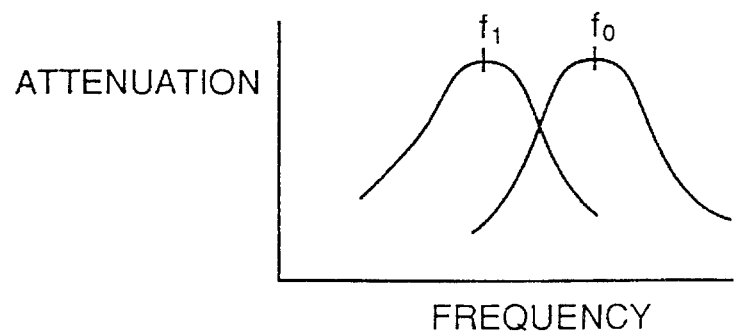
FIG. 5 shows frequency-amplitude characteristics of the dielectric filter shown in FIG. 4.

FIG. 5 shows frequency-amplitude characteristics of the dielectric filter circuit shown in FIG. 4. In the dielectric filter circuit shown in FIG. 4, when switches S4 and S5 are off as shown in FIG. 4, the composite resonance frequency of resonators R1 and R2 is $f_0$ as shown in FIG. 5. When switches S4 and S5 are on, capacitor C4 is connected parallel to resonator R1, and capacitor C5 is connected parallel to resonator R2, and thus the resulting composite resonance frequency becomes $f_1$. In this manner, by switching of switches S4 and S5 in one dielectric filter circuit, the circuit can be used as two filters having composite resonance frequencies of $f_0$ and $f_1$.

Figure 1:
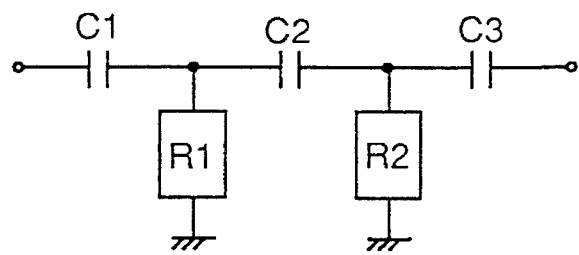
FIG. 1 is a schematic diagram of a conventional dielectric resonator.
Figure 2:
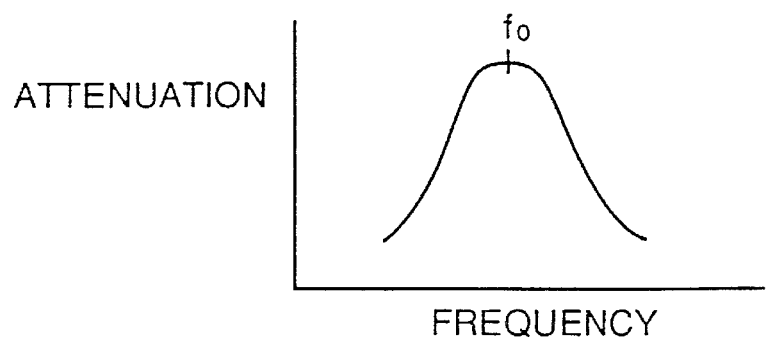
FIG. 2 shows the frequency-amplitude characteristic of the dielectric resonator shown in FIG. 1.
Figure 3:
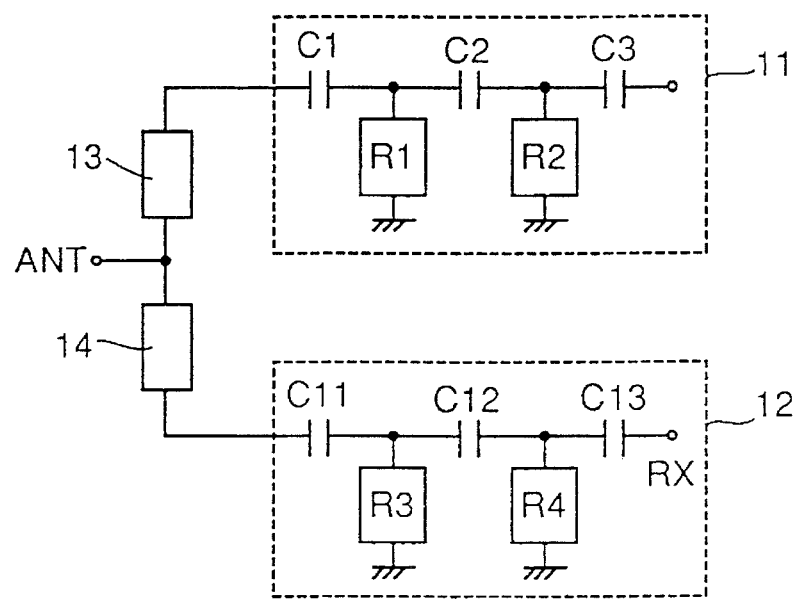
FIG. 3 is a schematic diagram showing a conventional, duplex-type dielectric filter.
Figure 6:
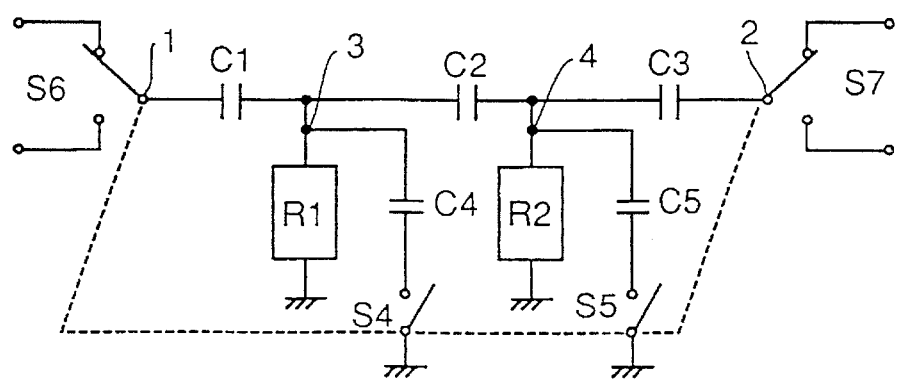
FIG. 6 is a schematic diagram of the dielectric filter in accordance with another preferred embodiment of the present invention.

FIG. 6 is a schematic diagram of a dielectric filter in accordance with another embodiment of the present invention. Referring to FIG. 6, an input-side circuit switch S6 is connected to input terminal 1, and an output-side circuit switch S7 is connected to an output terminal 2. These switches S6 and S7 are switched in ganged relation with switches S4 and S5. Therefore, by using one of the inputs of switch S6 for transmission and another for reception, and by using one of the outputs of switch S7 for transmission and another for reception, the dielectric filter circuit can be used as a duplexer, and matching circuits 13 and 14 of the prior art shown in FIG. 3 become unnecessary.

Depending on the condition of the circuit, the input-side circuit switch S6 may be eliminated.

Figure 7:
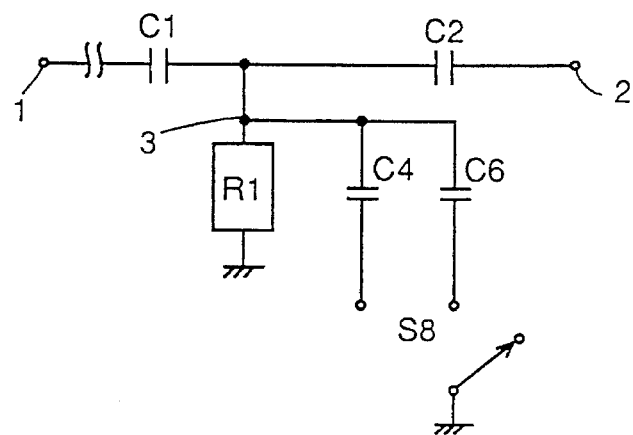
FIG. 7 is a schematic diagram showing the dielectric filter in accordance with a third preferred embodiment of the present invention.

FIG. 7 is a schematic diagram showing a third preferred embodiment of the present invention. The embodiment of FIG. 7 includes two capacitors C4 and C6 having different capacities (where the capacity of these capacitors satisfy C4<C6) each connected in parallel to resonator R1 through a three contact switch S8, between one end 3 of resonator R1 and ground.

Figure 8:
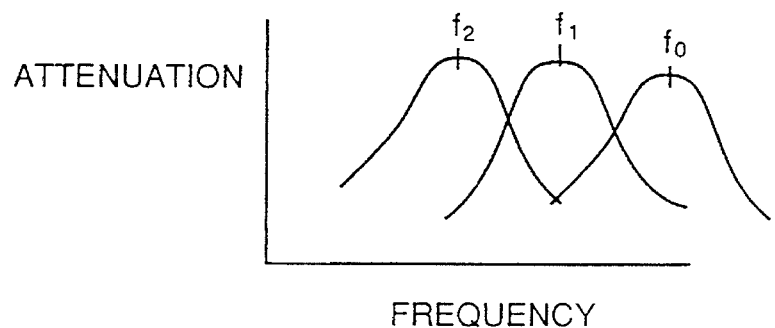
FIG. 8 shows frequency-amplitude characteristics of the dielectric filter shown in FIG. 7.

FIG. 8 shows frequency-amplitude characteristics of the embodiment shown in FIG. 7. In the embodiment shown in FIG. 7, if the switch S8 is off, only one end of resonator R1 is grounded, and therefore an output having the central frequency of $f_0$ of resonator R1 is provided from output terminal 2, as shown in FIG. 8. When S8 is connected to the side of capacitor C4, capacitor C4 is connected in parallel with resonator R1, and a signal having the resonance frequency of $f_1$ is provided from output terminal 2. When switch S8 is connected to the side of capacitor C6, capacitor C6 is connected parallel to resonator R1, and a signal having the resonance frequency $f_2$ is provided from output terminal 2. Therefore, in this embodiment, three different frequencies can be selected.

Figure 9:
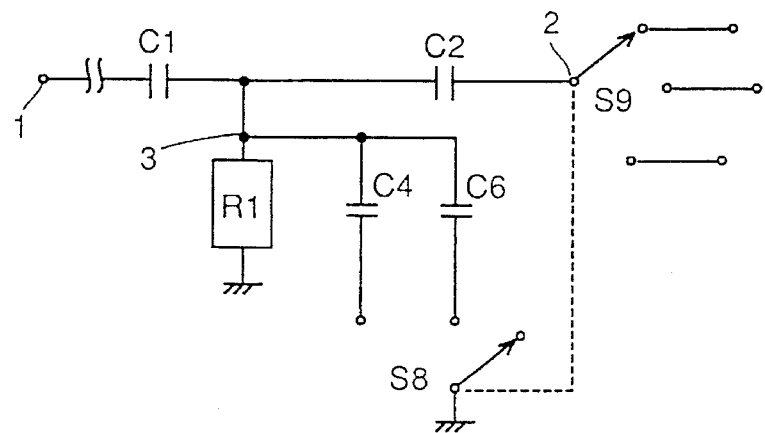
FIG. 9 is a schematic diagram of the dielectric filter showing a fourth preferred embodiment of the present invention.

FIG. 9 is a schematic diagram showing a fourth preferred embodiment of the present invention. In the embodiment shown in FIG. 9, a three-contact switch S9 is connected to output terminal 2, so as to allot output signals to a distribution circuit of the succeeding stage. As shown by the dotted line, the three-contact switch S9 is related to switch S8.

Though the present invention has been applied to a dielectric resonator circuit having two stages of bandpass filters in the above-described embodiments, it is not limited to this and the present invention can also be applied to multiple stages of bandpass filters. Further, resonators R1 and R2 are not limited to the ones of $\lambda/4$, and a resonator having the wavelength of $\lambda/2$ may be used, for example. Further, a reactance element such as an inductance may be connected parallel to resonators R1, R2, in place of the capacitor. In this case, the composite resonance frequency is shifted to a higher value. Further, the present invention may be applied not only to the bandpass filter but also to a band-eliminating filter. Not only discrete dielectric resonators R1, R2 but also block-type resonators may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dielectric filter circuit having an input terminal and an output terminal, and formed of at least one dielectric resonator, said circuit comprising:

a reactance element having one end connected to one end of said at least one dielectric resonator;

a selection switch for selectively connecting another end of said reactance element to another end of said at least one dielectric resonator for selecting a resonance frequency of said circuit; and an output switch connected to said output terminal and related to said selection switch, for selectively distributing an output signal of said dielectric resonator when said resonance frequency is selected with said selection switch.

2. The dielectric filter circuit according to claim 1, wherein said reactance element includes a plurality of elements each having one end connected to one end of said at least one dielectric resonator, and said selection switch includes a contact for selectively connecting another end of said plurality of elements to another end of said at least one dielectric resonator.

3. The dielectric filter circuit according to claim 2, wherein said plurality of elements comprise at least one capacitor.

4. The dielectric filter circuit according to claim 3, wherein said plurality of elements are capacitors.

5. The dielectric filter circuit according to claim 1, further comprising:

an input switch connected to said input terminal and related to said selection switch and said output switch, for selectively switching an input signal applied to said dielectric resonator when said resonance frequency is selected with said selection switch and said output signal is selectively distributed with said output switch.

6. The dielectric filter circuit according to claim 1, wherein said reactance element is a capacitor.

7. The dielectric filter circuit according to claim 1, wherein said at least one dielectric resonator is a discrete dielectric resonator.

8. The dielectric filter circuit according to claim 1, wherein said at least one dielectric resonator is a block-type dielectric resonator.

9. The dielectric filter circuit according to claim 1, further comprising:

an input switch connected to said input terminal and related to said selection switch, for selectively switching an input signal applied to said dielectric resonator when said resonance frequency is selected with said selection switch.

10. A dielectric filter circuit comprising:

an input;

an output;

two coupling elements connected at a node and in series between said input and said output;

a dielectric resonator connected between said node and ground;

at least two reactance elements, each having one end connected to said note;

a selection switch for selectively connecting another end of said at least two reactance elements to ground for selecting a resonance frequency of said resonator; and an output switch connected to said output and related to said selection switch, for selectively distributing an output signal of said dielectric resonator when said resonance frequency is selected with said selection switch.

11. The dielectric filter circuit according to claim 10, wherein said reactance elements are capacitors.

12. A dielectric filter circuit comprising:

an input;

an output;

first, second and third coupling elements connected in series between said input and said output, said first and second coupling elements being connected at a first node, and said second and third coupling elements being connected at a second node;

a first dielectric resonator connected between said first node and ground;

a second dielectric resonator connected between said second node and ground;

first and second series circuits each having a selection switch and a reactance element connected between said first and second nodes and ground, respectively, for selecting resonance frequencies of said resonators; and an output switch connected to said output and related to said selection switches, for selectively distributing an output signal of said dielectric resonators when said resonance frequencies are selected with said selection switches.

13. The dielectric filter circuit according to claim 12, further comprising:

an input switch connected to said input and related to said selection switches and said output switch, for selectively switching an input signal applied to said dielectric resonators when said resonance frequencies are selected with said selection switches, and said output signal is selectively distributed with said output switch.

14. The dielectric filter circuit according to claim 12, further comprising:

an input switch connected to said input and related to said selection switches, for selectively switching an input signal applied to said dielectric resonators when said resonance frequencies are selected with said selection switches.

15. The dielectric filter circuit according to claim 12, wherein said reactance elements are capacitors.

* * * * *